UNITED STATES PATENT OFFICE.

CELIA C. SCHOELLER, OF PITTSBURG, PENNSYLVANIA.

ALTERATIVE REMEDY.

SPECIFICATION forming part of Letters Patent No. 370,976, dated October 4, 1887.

Application filed May 19, 1887. Serial No. 238,780. (No specimens.)

*To all whom it may concern:*

Be it known that I, CELIA C. SCHOELLER, residing at Pittsburg, in the county of Allegheny and State of Pennsylvania, a citizen of the United States, have invented or discovered a certain new and useful Improvement in an Herb Compound, of which improvement the following is a specification.

The purpose of my invention is to cleanse impure blood and to tone up the system; and it will be found beneficial in dyspepsia, kidney, liver, stomach, and skin diseases.

My medicine consists of the following ingredients, combined in the proportions stated, viz: gum-arabic, (*Gum acacia,*) two ounces; burdock-root, (*Lappa minor,*) two pounds; wild-cherry bark, (*Prunus Virginiana,*) one pound; sassafras-bark, (*Sassafras radicis cortex,*) one pound; blue-flag root, (*Iris versicolor,*) one-half pound; calamus-root, (*Calamus aromaticus,*) one-half pound; elecampane, (*Inula helenium,*) one pound; licorice-root, (*Glycyrrhizæ radix,*) one-half pound; snake-root, (*Serpentaria Virginiana,*) one ounce; dog-wood bark, (*Cornus circinata,*) four ounces; prunes, one pound; dandelion, (*Taraxacum dens-leonis,*) one pound; honey, one pound; loaf-sugar, one-half pound; whisky, (*Spiritus frumenti,*) one quart; pickanicka-root (root of pipsissewa,) one pound.

The roots and barks above named I use, in preference, in their fresh and green condition. The ingredients above specified are thoroughly boiled, usually about nine hours, till reduced to an extract, water being added as required, but in such quantities that the extract made up of the above weights and quantities shall after boiling nine hours be reduced to a gallon. I prefer to add the whisky and gum-arabic in the last stage of the process, or about a half hour before the extract is removed from the stove. The average dose is a tea-spoonful three times a day.

What I claim, and desire to secure by Letters Patent of the United States, is—

The herein-described composition of matter to be used for blood and skin diseases, consisting of gum-arabic, burdock-root, wild-cherry bark, sassafras-bark, blue-flag root, calamus-root, elecampane, licorice-root, Virginia snake-root, dog-wood bark, prunes, dandelion, honey, loaf-sugar, whisky, pipsissewa-root, and water, in the proportions specified.

In testimony whereof I have hereunto set my hand.

CELIA C. SCHOELLER.

Witnesses:
WILLIAM L. PIERCE,
HILARY B. BRUNOT.